(12) United States Patent
Sharma et al.

(10) Patent No.: US 10,057,939 B2
(45) Date of Patent: Aug. 21, 2018

(54) MANAGING PACKET-SWITCHED VOICE COMMUNICATIONS DURING SILENCE INTERVALS

(71) Applicant: Apple Inc., Cupertino, CA (US)

(72) Inventors: Prateek Sharma, Milpitas, CA (US); Sanjay K. Verma, San Jose, CA (US); Deepankar Bhattacharjee, Milpitas, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 14/863,214

(22) Filed: Sep. 23, 2015

(65) Prior Publication Data

US 2016/0373585 A1 Dec. 22, 2016

Related U.S. Application Data

(60) Provisional application No. 62/180,454, filed on Jun. 16, 2015.

(51) Int. Cl.
*H04W 76/28* (2018.01)
*H04W 76/25* (2018.01)
*H04W 76/38* (2018.01)
*H04W 4/16* (2009.01)
*H04W 76/04* (2009.01)
*H04W 76/06* (2009.01)

(52) U.S. Cl.
CPC ............ *H04W 76/28* (2018.02); *H04W 4/16* (2013.01); *H04W 76/045* (2013.01); *H04W 76/048* (2013.01); *H04W 76/068* (2013.01); *H04W 76/25* (2018.02); *H04W 76/38* (2018.02)

(58) Field of Classification Search
None
See application file for complete search history.

(56) References Cited

U.S. PATENT DOCUMENTS

| 8,295,165 | B2 | 10/2012 | Jung et al. |
| 8,537,666 | B2 | 9/2013 | Harada et al. |
| 8,700,390 | B2 | 4/2014 | Chen et al. |
| 8,730,921 | B2 | 5/2014 | Al-Khudairi et al. |
| 8,954,056 | B2 | 2/2015 | Shimizu |
| 2004/0190493 | A1* | 9/2004 | Yao ..................... H04W 76/068 370/352 |
| 2017/0099696 | A1* | 4/2017 | Sakurai ................. H04W 16/32 |
| 2017/0280389 | A1* | 9/2017 | Guilhaumon ..... H04W 52/0216 |

* cited by examiner

*Primary Examiner* — Yaotang Wang
(74) *Attorney, Agent, or Firm* — Meyertons Hood Kivlin Kowert & Goetzel, P.C.; Jeffrey C. Hood; Michael B. Davis (57) ABSTRACT

In some embodiments, a UE is configured to, in response to detecting an absence of received packets associated with a voice call over a first time interval of a pre-determined length, initiate transmission of a first control packet to a base station. In some embodiments, the UE is further configured, based on a response to the first control packet, not to drop the packet-switched voice call at least until expiration of a second time interval of a pre-determined length after transmission of the first control packet. In some embodiments, the absence of received packets is an absence of both voice and silence packets. In some embodiments, based on absence of a response to the first control packet, the UE is configured to drop the packet-switched call.

13 Claims, 6 Drawing Sheets

MANAGING PACKET-SWITCHED VOICE COMMUNICATIONS DURING SILENCE INTERVALS

PRIORITY CLAIM

This application claims the benefit of U.S. Provisional Application No. 62/180,454, filed on Jun. 16, 2015, which is incorporated by reference herein in its entirety.

FIELD

The present application relates to wireless devices, and more particularly to packet-switched voice communications that utilize silence packets.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1 xRTT, 1 xEV-DO, HRPD, eHRPD), IEEE 802.11 (WLAN or Wi-Fi), IEEE 802.16 (WiMAX), Bluetooth, and others.

Wireless technologies are increasingly using packet-switched connections for performing voice and video communication between users, e.g., using VoLTE (Voice over LTE (Long Term Evolution)) or video over LTE. Past technologies typically utilized circuit-switched networks for voice communications and packet-switched networks for data.

To reduce bandwidth in packet-switched voice communications when one party is silent, silence descriptor (SID) packets are often sent periodically. These packets may be used by the other device to generate "comfort noise," so that its user does not think the call has been dropped because of the silence.

Applicant is aware of at least one prior art mobile device that is configured to drop a call after detecting an absence of received Real Time Protocol (RTP) packets, such as SID packets, over a particular timeout interval. This may allow calls to be dropped when call quality is very poor, such as when signal conditions are so weak, for example, that transmitted RTP packets (and/or SID packets) are not received over the timeout interval. Some networks, however, are configured to suppress transmission of SID packets (which may often carry redundant information) in order to reduce power consumption. For UEs configured to drop a call when SID packets are not received, this may cause calls to be dropped unexpectedly. Therefore, improvements in managing signaling in situations where one or more parties to a packet-switched voice call are silent are desired.

SUMMARY

Embodiments are presented herein of methods for providing improved communication performance for wireless devices, and of devices (e.g., wireless devices (UEs), base stations) configured to implement the methods. For example, embodiments presented herein may provide improved LTE or LTE-Advanced performance for wireless devices. Some embodiments may relate to a user equipment (UE) that comprises at least one antenna, at least one radio, and a processing element, and which is configured to perform a subset or all of the operations described herein.

In some embodiments, a UE is configured to, in response to detecting an absence of received packets associated with a voice call over a first time interval of a pre-determined length, initiate transmission of a first control packet to a base station. In some embodiments, the UE is further configured, based on a response to the first control packet, not to drop the packet-switched voice call at least until expiration of a second time interval of a pre-determined length after transmission of the first control packet. In some embodiments, the absence of received packets is an absence of both voice and silence packets. In some embodiments, based on absence of a response to the first control packet, the UE is configured to drop the packet-switched call.

In some embodiments, a base station is configured to transmit one or more packets associated with a packet-switched voice call during a silence interval, while performing SID suppression for the voice call.

In some embodiments, a UE is configured to determine whether to drop a packet-switched voice call based on recognition of a pattern of silence packets associated with the call prior to an absence of received packets associated with the call.

In various embodiments, disclosed techniques may reduce power consumption by efficiently managing signaling during intervals in which at least one party is silent in packet-switched voice communications.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms may be used in the present disclosure.

3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
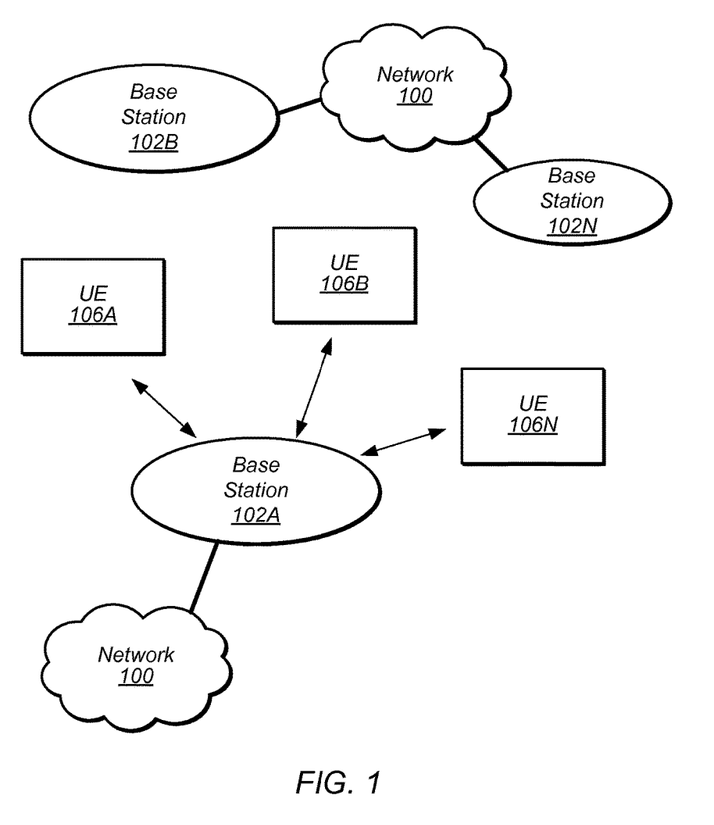
FIG. 1 illustrates an exemplary (and simplified) wireless communication system, according to some embodiments.
Figure 2:
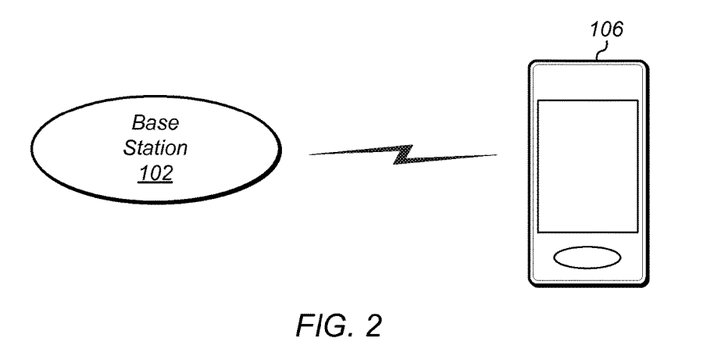
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1 xRTT, 1 xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1 xRTT, 1 xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1 xRTT/1 xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1 xRTT (or LTE or GSM), and separate radios for communicating using each of Wi-Fi and Bluetooth. Other configurations are also possible.

Figure 3:
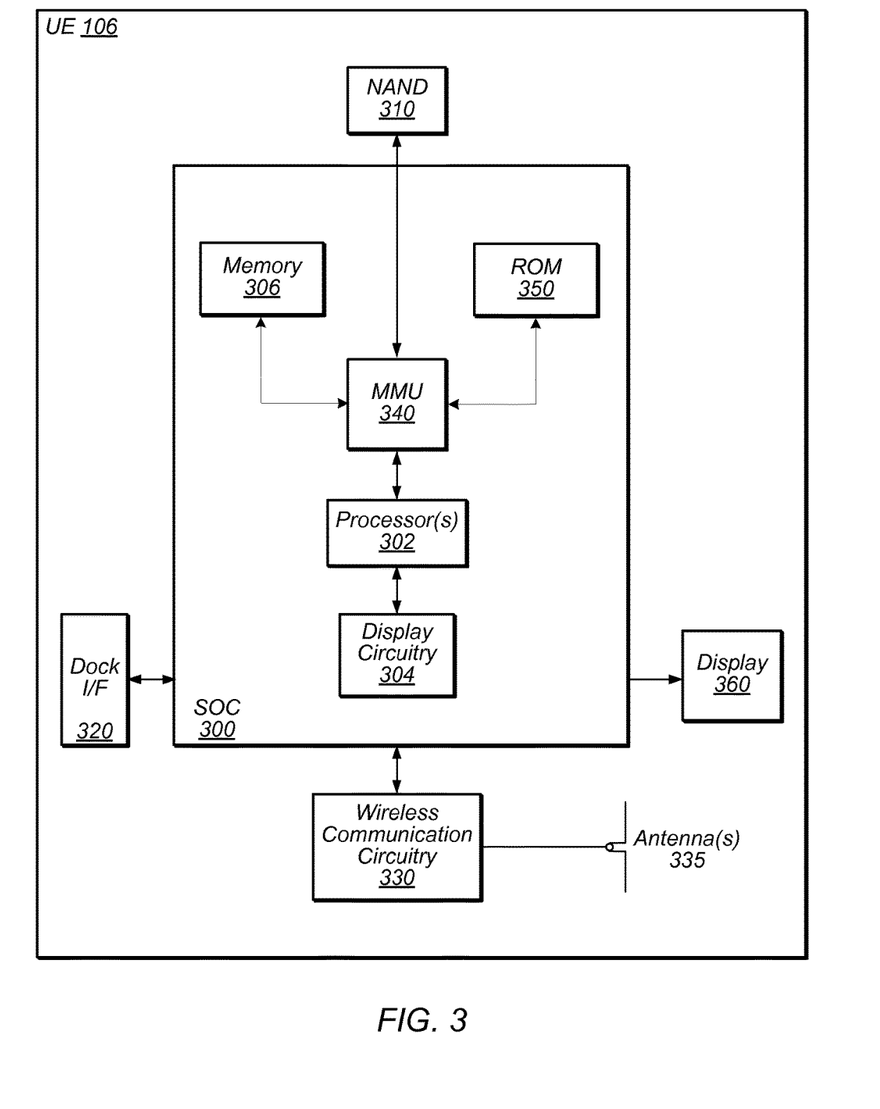
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
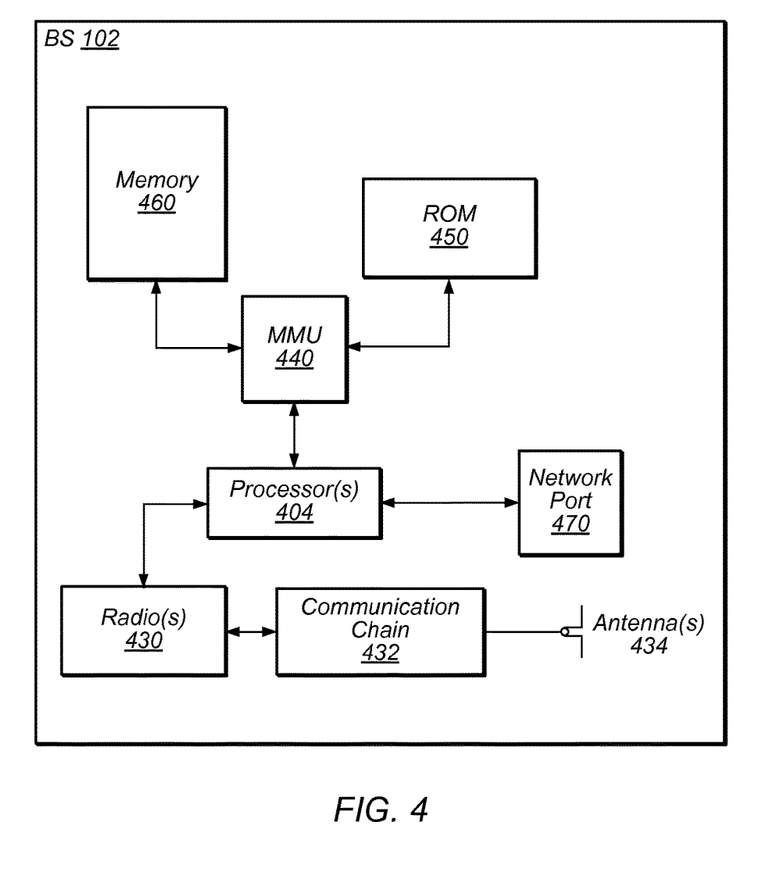
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Exemplary Techniques for Managing Communications During Silence Intervals

In some embodiments, for a voice call with respective first and second users, the network is configured to transmit real time protocol (RTP) packets every 20 milliseconds (ms) to a device of the first user, when the second user is speaking. In some embodiments, when the second user is not speaking, the network is configured to transmit silence descriptor (SID) packets to the device of the first user at a slower rate, e.g., every 160 ms. The SID packets may be RTP SID packets. In some embodiments, the SID packets include information specifying comfort noise to be played on the device of the first user, e.g., so that the first user does not think that the call has been dropped.

In some embodiments, base station 102 is configured to suppress SID packets (e.g., by refraining from sending SID packets every 160 ms) during silence intervals based on various criterion. For example, base station 102 may suppress SID packets based on determining that a particular number of consecutive SID packets have been sent, based on determining that the SID packets contain redundant information, etc.

In some embodiments, UE 106 is configured to drop packet-switched calls based on inactivity (e.g., a lack of received packets). For example, in some embodiments, if UE 106 has not received RTP packets for a call in ten seconds, UE 106 is configured to drop the call. This may avoid a situation where a user thinks that the call is on-going and that the other party is just silent, when in reality the network conditions are too poor for an audible conversation. Dropping calls may be undesirable, however, in situations where the network is performing SID suppression to reduce power consumption.

Therefore, in some embodiments, UE 106 is configured to refrain from dropping such calls based on detecting a pattern of silence packets, detecting other types of packets, and/or based on transmitting control packets to the network. This may avoid incorrectly dropping calls when the network is configured to perform SID suppression.

As used herein, the term "silence interval" refers to a time interval over which at least one device involved in a communication is not receiving audio input above some threshold level (e.g., when the user of the device is silent). Thus, during a silence interval for a two-party voice communication, one party may be talking and the other silent or both parties may be silent. Further, a silence interval for a particular device refers to an interval during which that device is not receiving audio input above some threshold level.

In some embodiments, UE 106 is configured to detect a pattern in received SID packets. For example, in some embodiments, if UE 106 detects three or more consecutive RTP silence packets within a time interval (e.g., 500 ms, which may be configurable), UE 106 is configured not to drop the call based on failure to receive further silence packets. In other embodiments, UE 106 may be configured to recognize any of various appropriate patterns that are commonly used by one or more networks prior to SID suppression.

On the other hand, in these embodiments, if UE 106 detects an absence of RTP packets over a threshold time interval, but does not detect the pattern (e.g., the absence occurs after receiving only a single RTP silence packet or some other non-matching combination of packets), then UE 106 may be configured to drop the call. This may allow the network to perform SID suppression without causing unexpected dropped calls by UE 106. In some embodiments, the network may provide information indicating its SID suppression technique, which may allow UE 106 to configure its pattern recognition circuitry and/or software to accurately distinguish between SID suppression by the network and an absence of packets based on a poor wireless connection, for example.

An exemplary method relating to patterns is discussed in further detail below with reference to FIG. 8.

In some embodiments, when the network stops sending RTP packets to UE 106 based on SID suppression, the network is still configured to send RTP control protocol (RTCP) packets to UE 106 during silence intervals. RTCP packets may be used to provide out-of-band (OOB) statistics and control information for an RTP session. RTCP may be used to provide quality of service (QoS) feedback by periodically sending statistics information to participants in a multimedia session (e.g., a VoLTE call). Exemplary statistics include packet counts, packet loss, packet delay variation, round-trip delay time, etc.

In some embodiments, UE 106 is configured to monitor for RTCP packets as well as RTP packets when determining whether to drop a call. For example, in some embodiments, upon expiration of an RTP monitoring window (and/or during the window), UE is configured to start monitoring for RTCP packets. In some embodiments, upon receipt of an RTCP packet, UE 106 is configured to reset the monitoring window (e.g., by resetting a timer). In some embodiments, base station 102 is configured to periodically send RTCP packets (e.g., using a periodicity that is smaller than the monitoring window of UE 106) to prevent dropped calls during silence intervals.

Figure 5:
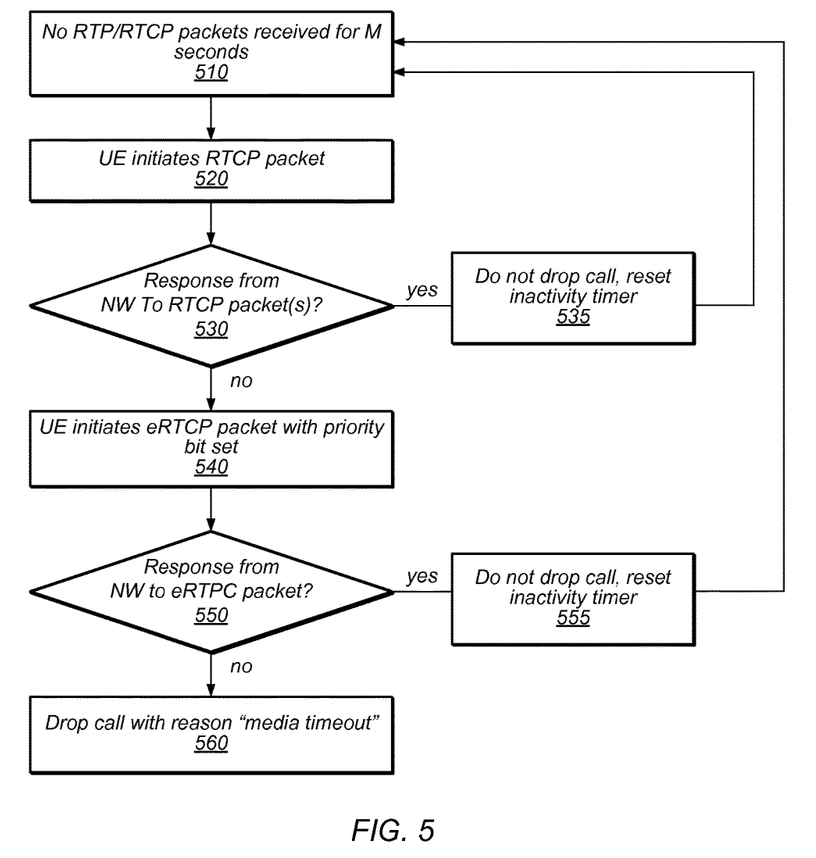
FIG. 5 is a flowchart diagram illustrating a method for managing packet-switched voice communications during silence intervals, according to some embodiments.

In some situations, however, UE 106 may not receive RTCP packets, even when it should not drop the call (e.g., the network may not be configured to send RTCP packets during silence intervals in various situations). Referring now to FIG. 5, a flow diagram illustrating exemplary UE techniques for pinging the network during SID suppression is shown, according to some embodiments. While elements of the method of FIG. 5 are described substantially with reference to the LTE wireless communication technology, part or all of the method may be used in conjunction with other wireless communication technologies, as desired. The method shown in FIG. 5 may be used in conjunction with any of the computer systems or devices shown in the above FIGS. 1-4, among other devices. In various embodiments, some of the elements of the scheme shown may be performed concurrently, in a different order than shown, or may be omitted. Additional elements may also be performed as desired.

At 510, UE 106 determines that no RTP or RTCP packets have been received for M seconds (where M may be configurable and/or may be set to various values, including fractional numbers of seconds or other units of time). In some embodiments, checking for both RTP and RTCP packets for a given packet-switched call may avoid dropped calls (e.g., when RTCP packets are sent during SID suppression).

At 520, in response to the determination that no RTP/RTCP packets were received for M seconds, UE 106 initiates transmission of one or more RTCP packets to the network. In some embodiments, the RTCP packet(s) correspond to a sender report (SR). In some embodiments, the packet(s) also correspond to a receiver report (RR).

At 530, UE 106 determines whether there was a response from the network to the RTCP packet(s). In the illustrated embodiment, if there was a response, the method proceeds to 535. At 535, UE 106 does not drop the call, and resets an inactivity timer (e.g., corresponding to M).

In some embodiments, if there was not a response to the RTCP packet, the method proceeds to 540. In some embodiments, UE 106 may determine that a response was not received based on expiration of a threshold time interval, failure to respond before a requested time slot, etc. At 540, UE 106 initiates transmission of an RTCP packet with a priority indication set. In some embodiments, the priority indication is a bit acts as a warning to the network that the call will be dropped if there is no response. In some embodiments, packets that include a field for the priority indication may be referred to as enhanced RTCP (eRTCP) packets. When the priority indication is set, it may mandate that the network respond if possible. Thus, in some embodiments, base station 102 is configured to always respond, if able, to eRTCP packets with the priority indication set unless it determines that the call should be dropped (e.g., based on a weak link with another device participating in the call). In some embodiments, UE 106 is configured to send multiple eRTCP packets and wait for a response before proceeding to 560. In some embodiments, the number of eRTCP packets sent in 540 is configurable.

In other embodiments, the method may proceed directly from 530 to 560 and the call may be dropped if there is no response to the RTCP packets in 530, rather than using eRTCP packets.

At 550, UE 106 determines whether the network responded to the eRTCP packet(s). If the network responded, the method proceeds to 555 and UE 106 does not drop the call, but instead resets the inactivity timer. If the network did not respond, UE 106 is configured to drop the call. In the illustrated embodiment, UE 106 is configured to use the RTP "media timeout" breaker to end the call.

In some embodiments, a call may proceed through the illustrated flow multiple times if it is not dropped, and/or may eventually be dropped based on deteriorating wireless conditions. In various the illustrated techniques may allow SID suppression without causing unnecessary dropped calls. This may reduce power consumption by mobile device 106, in some embodiments.

Figure 6:
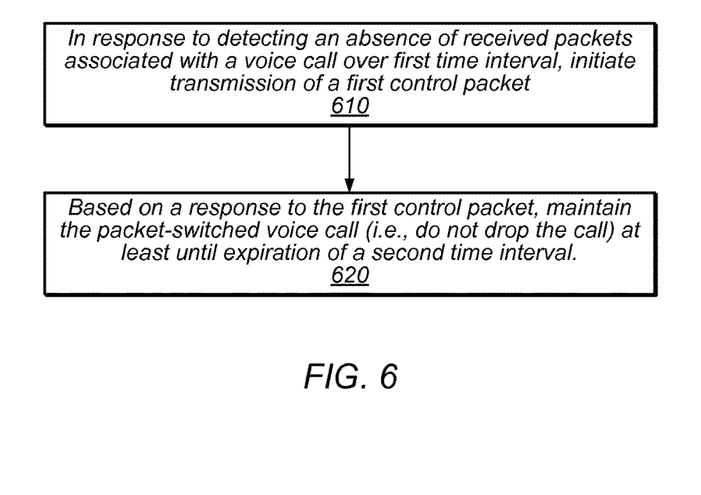
FIG. 6 is a flowchart illustrating a method for pinging a network during SID suppression, according to some embodiments.

FIG. 6 is a flow diagram illustrating a simplified method for pinging the network during SID suppression, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, an apparatus (e.g., a UE), in response to detecting an absence of received packets associated with a voice call over a first time interval, initiates transmission of a first control packet.

At 620, the apparatus, based on a response to the first control packet, maintains the packet-switched voice call (e.g., rather than dropping the voice call based on the absence of packets during the time interval) at least until expiration of a second time interval (which may commence at transmission of the control packet, reception of the response, etc.). In some embodiments, this may allow the apparatus to ping the network and determine whether the absence of received packets is due to network conditions or SID suppression. If the apparatus does not receive a response to the first control packet, it may drop the call or may send one or more additional control packets and wait for a response before dropping the call.

As mentioned above, in some embodiments base station 102 is configured to send packets (e.g., SID RTP or RTCP packets) periodically during SID suppression (although at a slower rate than the traditional SID rate, such that some SIDs are still suppressed). For example, after beginning SID suppression, base station 102 may subsequently send a packet every X seconds for Y times. This may avoid UE timer expiration and avoid dropped calls, in some embodiments. Further, the periodically transmitted packets may be SID packets that include comfort noise information, e.g., if the comfort noise environment changes during the silence interval. In some embodiments, X may be 9.5 seconds, for example. In some embodiments, X is smaller than a timeout interval of UE 106. In some embodiments, handshaking is performed to configure UE 106 and/or base station 102 such that X is smaller than the timeout interval of UE 106 (e.g., by increasing the timeout interval of UE 106 and/or decreasing the value of X). In some embodiments, after Y iterations of sending packets after X seconds, the network may trigger a call disconnect if it has not received transmission from the UE. This may be caused by a faulty wireless link, for example.

Figure 7:
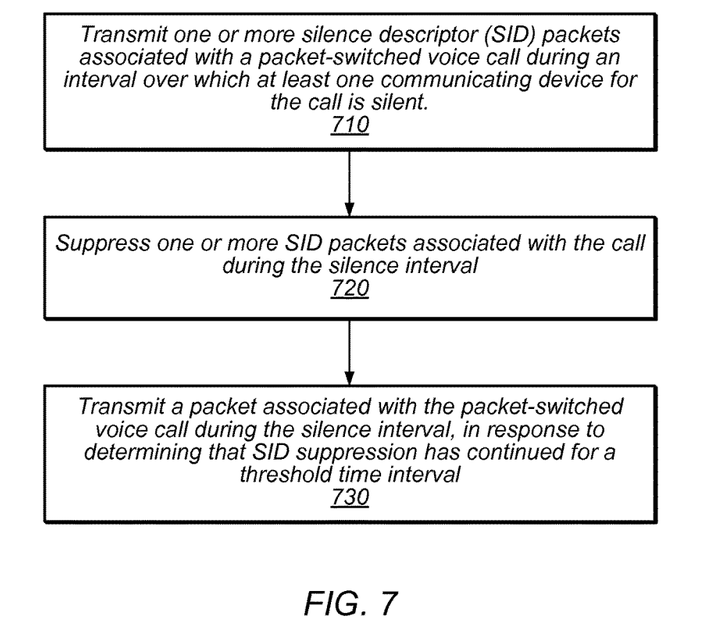
FIG. 7 is a flowchart illustrating a method for periodically transmitting packets during SID suppression, according to some embodiments.

FIG. 7 is a flow diagram illustrating a method for transmitting periodic packets during silence intervals, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, the base station transmits one or more SID packets associated with a packet-switched voice call during an interval over which at least one communicating device for the call is silent.

At 720, the base station suppresses one or more SID packets (e.g., by not transmitting the suppressed packets) associated with the call during the silence interval. This may reduce power consumption and network congestion, in some embodiments, especially for relatively long silence intervals.

At 730, the base station transmits a packet associated with the packet-switched voice call during the silence interval, in response to determining that SID suppression has continued for a threshold time interval. This packet may allow a communicating device to determine that an absence of packets from the base station is based on SID suppression rather than poor network conditions, which may allow the communicating device to maintain the call rather than dropping the call. In some embodiments, the base station and one or more of the communicating devices may negotiate the length of the threshold time interval.

Figure 8:
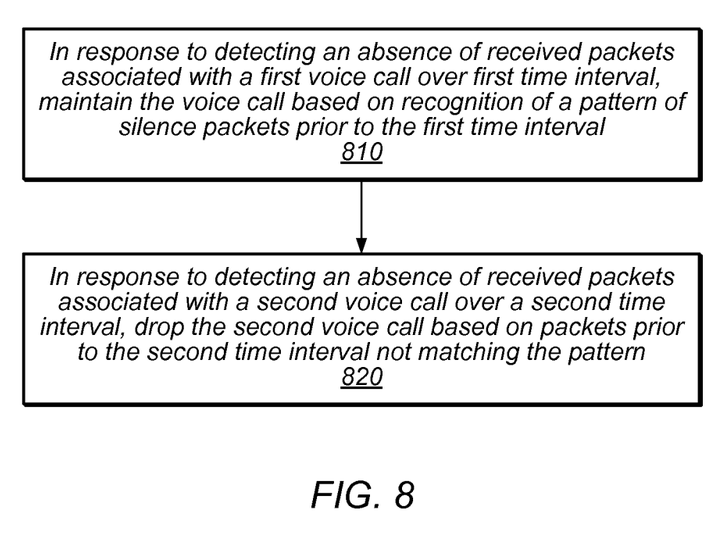
FIG. 8 is a flowchart illustrating a method for recognizing patterns in silence packets prior to SID suppression, according to some embodiments.

FIG. 8 is a flow diagram illustrating a method for recognizing patterns in silence packets prior to SID suppression, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 810.

At 810, an apparatus (e.g., a UE), in response to detecting an absence of received packets associated with a first voice call over a first time interval, maintains the voice call based on recognition of a pattern of silence packets prior to the first time interval. For example, the pattern may include three or more silence packets within a time interval followed by an absence of silence packets.

At 820, the apparatus, in response to detecting an absence of received packets associated with a second voice call over a second time interval, drops the second voice call based on packets prior to the second time interval not matching the pattern. The method of FIG. 8 may allow the apparatus to drop calls in poor network conditions while maintaining calls during SID suppression intervals, in some embodiments.

In some embodiments, various techniques discussed above may be combined. For example, UE 106 may be configured to send control packets only if it does not recognize a pattern in received SID packets, which may further reduce power consumption in situations where the SID suppression matches a known patter. Further, in embodiments in which the network is configured to periodically transmit control packets during silence intervals, UE 106 may be configured to send a control packet at the end of a timeout interval if no control packet is received from the network, providing further protection against inappropriate dropped calls.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, an apparatus comprises means for performing one or more of the method elements of one or more of FIGS. 5-8.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processing elements configured to:
process packets transmitted and received during a packet-switched voice call;
in response to detecting an absence of received packets associated with the packet-switched voice call over a first time interval of a pre-determined length, initiate transmission of a first control packet to a base station; and
based on a response to the first control packet, not drop the packet-switched voice call at least until expiration of a second time interval of a pre-determined length after transmission of the first control packet;
based on absence of a response to the first control packet, initiate transmission of a set of control packets to the base station, wherein ones of the set of control packets include a high priority indication;
based on absence of a response to the set of control packets, drop the packet-switched voice call; and
based on a response to at least one of the set of control packets, refrain from dropping the packet-switched voice call at least until expiration of a third time interval of a pre-determined length subsequent to transmission of the set of control packets.

2. The apparatus of claim 1, wherein the apparatus is a user equipment device (UE) that further includes:
at least one antenna; and
a radio coupled to the at least one antenna for performing wireless cellular communications with the base station;
wherein the one or more processing elements are coupled to the radio.

3. The apparatus of claim 1, wherein the apparatus is configured to drop the packet-switched voice call using a media timeout indication.

4. The apparatus of claim 1, wherein the absence of received packets is an absence of both voice real time protocol (RTP) packets and silence RTP packets and wherein the first control packet is a RTP control protocol (RTCP) packet.

5. The apparatus of claim 1, wherein the set of control packets are critical control (eRTPC) packets.

6. The apparatus of claim 1, wherein the high priority indication indicates that the apparatus will drop the call if the base station does not respond to the set of control packets.

7. The apparatus of claim 1, wherein the apparatus is configured to utilize the first control packet to assess whether one or more wireless connections for the voice call remain.

8. The apparatus of claim 1, wherein the first control packet is an RTP control protocol (RTCP) packet.

9. The apparatus of claim 1, further comprising a timer configured to measure one or both of the first time interval or the second time interval.

10. A non-transitory computer-readable medium having instructions stored thereon that are executable by a computing device to perform operations comprising:
  processing packets transmitted and received during a packet-switched voice call;
  in response to detecting an absence of received packets associated with the packet-switched voice call over a first time interval of a pre-determined length, initiating transmission of a first control packet to a base station; and
  based on a response to the first control packet, not dropping the packet-switched voice call at least until expiration of a second time interval of a pre-determined length after transmission of the first control packet;
  based on absence of a response to the first control packet, initiating transmission of a set of control packets to the base station, wherein ones of the set of control packets include a high priority indication;
  based on absence of a response to the set of control packets, dropping the packet-switched voice call; and
  based on a response to at least one of the set of control packets, refraining from dropping the packet-switched voice call at least until expiration of a third time interval of a pre-determined length subsequent to transmission of the set of control packets.

11. The non-transitory computer-readable medium of claim 10, wherein the dropping uses a media timeout indication.

12. The non-transitory computer-readable medium of claim 10, wherein the absence of received packets is an absence of both voice real time protocol (RTP) packets and silence RTP packets and wherein the first control packet is a RTP control protocol (RTCP) packet.

13. The non-transitory computer-readable medium of claim 10, wherein the set of control packets are critical control (eRTPC) packets.

* * * * *